United States Patent
Du et al.

(10) Patent No.: US 10,452,890 B2
(45) Date of Patent: Oct. 22, 2019

(54) FINGERPRINT TEMPLATE INPUT METHOD, DEVICE AND MEDIUM

(71) Applicant: Beijing Xiaomi Mobile Software Co., Ltd., Haidian District, Beijing (CN)

(72) Inventors: Hui Du, Beijing (CN); Kun Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 361 days.

(21) Appl. No.: 15/408,420

(22) Filed: Jan. 18, 2017

(65) Prior Publication Data

US 2017/0220846 A1    Aug. 3, 2017

(30) Foreign Application Priority Data

Jan. 29, 2016 (CN) .......................... 2016 1 0065364

(51) Int. Cl.
*G06K 9/00* (2006.01)

(52) U.S. Cl.
CPC ..... *G06K 9/00087* (2013.01); *G06K 9/00026* (2013.01); *G06K 9/00912* (2013.01); *G06K 9/00926* (2013.01)

(58) Field of Classification Search
CPC ........... G06K 9/00087; G06K 9/00026; G06K 9/00912; G06K 9/00926
See application file for complete search history.

(56) References Cited

U.S. PATENT DOCUMENTS

| | | | | |
|---|---|---|---|---|
| 6,546,122 B1* | 4/2003 | Russo | ................ | G06K 9/00026 382/125 |
| 7,236,617 B1* | 6/2007 | Yau | .................... | G06K 9/00026 382/125 |
| 7,382,904 B2 | 6/2008 | Lee | | |
| 7,574,022 B2* | 8/2009 | Russo | ................ | G06K 9/00026 382/124 |

(Continued)

FOREIGN PATENT DOCUMENTS

| | | |
|---|---|---|
| CN | 101499130 A | 8/2009 |
| CN | 102708360 A | 10/2012 |

(Continued)

OTHER PUBLICATIONS

Supplementary European Search Report in European application No. 16206997.5, dated Jun. 28, 2017.

(Continued)

*Primary Examiner* — Manav Seth
(74) *Attorney, Agent, or Firm* — Jun He Law Offices P.C.; James J. Zhu

(57) ABSTRACT

A fingerprint template input method, device, and medium are provided. The fingerprint template input method includes: an $i^{th}$ fingerprint image captured by a fingerprint identification sensor are acquired, i being a positive integer; a candidate fingerprint template is obtained according to all of the acquired i fingerprint images; it is detected whether the candidate fingerprint template meets a preset condition; and if the candidate fingerprint template meets the preset condition, the candidate fingerprint template is input as a fingerprint template of the user's fingerprint.

18 Claims, 9 Drawing Sheets

(56) References Cited

U.S. PATENT DOCUMENTS

| | | | | |
|---|---|---|---|---|
| 7,720,262 | B2* | 5/2010 | Svedin | G06F 21/32 |
| | | | | 382/115 |
| 7,885,436 | B2* | 2/2011 | Russo | G06K 9/00067 |
| | | | | 340/5.53 |
| 8,224,043 | B2* | 7/2012 | Yamada | G06K 9/00026 |
| | | | | 382/124 |
| 8,520,914 | B2* | 8/2013 | Niinuma | G06K 9/00093 |
| | | | | 340/5.83 |
| 8,635,211 | B2* | 1/2014 | Jiang | G06K 9/00758 |
| | | | | 707/723 |
| 8,649,570 | B2* | 2/2014 | Abiko | G06T 7/00 |
| | | | | 382/115 |
| 8,805,865 | B2* | 8/2014 | Samari | H04H 60/58 |
| | | | | 707/758 |
| 9,268,991 | B2* | 2/2016 | Russo | G06K 9/00087 |
| 9,483,679 | B2* | 11/2016 | Neskovic | G06K 9/00026 |
| 9,514,352 | B2* | 12/2016 | Setterberg | G06K 9/00026 |
| 9,521,314 | B2* | 12/2016 | Setterberg | G06K 9/00013 |
| 9,646,192 | B2* | 5/2017 | Cheng | G06K 9/00033 |
| 9,762,573 | B2* | 9/2017 | Li | H04L 63/0861 |
| 9,773,147 | B1* | 9/2017 | Kao | G06K 9/00926 |
| 9,785,863 | B2* | 10/2017 | Naruse | G06K 9/6203 |
| 10,061,971 | B2* | 8/2018 | Li | G06K 9/00013 |
| 10,146,990 | B2* | 12/2018 | Zhang | G06F 21/32 |
| 2003/0123715 | A1* | 7/2003 | Uchida | G06K 9/00026 |
| | | | | 382/124 |
| 2004/0091138 | A1 | 5/2004 | Lee | |
| 2007/0286464 | A1 | 12/2007 | Jayanetti | |
| 2008/0013808 | A1* | 1/2008 | Russo | G06K 9/00026 |
| | | | | 382/125 |
| 2010/0303311 | A1* | 12/2010 | Shin | G06K 9/00013 |
| | | | | 382/124 |
| 2013/0108125 | A1 | 5/2013 | Storm | |
| 2014/0003677 | A1* | 1/2014 | Han | G06K 9/00006 |
| | | | | 382/124 |
| 2016/0063298 | A1* | 3/2016 | Tuneld | G06K 9/00013 |
| | | | | 348/77 |
| 2016/0180145 | A1 | 6/2016 | Setterberg et al. | |
| 2016/0253548 | A1* | 9/2016 | Dos Remedios | G06K 9/00013 |
| | | | | 382/125 |
| 2017/0220847 | A1* | 8/2017 | Ji | G06K 9/00013 |

FOREIGN PATENT DOCUMENTS

| | | | |
|---|---|---|---|
| CN | 104463129 A | | 3/2015 |
| CN | 104463132 A | | 3/2015 |
| CN | 105095876 A | | 11/2015 |
| JP | 03218574 A | * | 9/1991 |
| WO | 2012008885 A1 | | 1/2012 |
| WO | 2016099381 A1 | | 6/2016 |

OTHER PUBLICATIONS

Shahram Orandi et al:"Mobile ID Device Best Practice Recorrmendation—Version1.0", Jul. 1, 2009(Jul. 1, 2009), XP055057025, Retrieved from the Internet:URL:http ://www.nist.gov/customcf/get_pdf.cfm?pub id=903169 [retrieved on Mar. 19, 2013]* Section 6 . 1. 2 *.

International Search Report in international application No. PCT/CN2016/101865, dated Jan. 13, 2017.

* cited by examiner

FINGERPRINT TEMPLATE INPUT METHOD, DEVICE AND MEDIUM

CROSS-REFERENCE TO RELATED APPLICATIONS

This application is filed based upon and claims priority to Chinese Patent Application No. 201610065364.7, filed on Jan. 29, 2016, the entire contents of which are incorporated herein by reference.

TECHNICAL FIELD

Embodiments of the present disclosure generally relate to the field of fingerprint identification, and more particularly, to a fingerprint template input method, device and medium.

BACKGROUND

The fingerprint identification technology has been widely applied in mobile terminals such as smart phones and tablet computers. The fingerprint identification technology includes two parts: a fingerprint template input process and a fingerprint identification process.

The fingerprint template input process refers to synthesizing multiple fingerprint images input by a user into a fingerprint template for storage in a fingerprint template database by virtue of a fingerprint algorithm. Under influence of multiple factors such as a user's operating habit and sensitivity of a fingerprint identification sensor, a single fingerprint image input by the user may not completely reflect fingerprint information of the user. In related art, the user is required to repeatedly input fingerprint images for a fixed number of times and multiple input fingerprint images are spliced into a fingerprint template. Such a fixed-number-of-inputs method improves quality of the fingerprint template by repeatedly inputting the fingerprint images of the same region, but results in a specified fixed number of inputs is much greater than a practically required number of inputs.

SUMMARY

According to a first aspect of the embodiment of the present disclosure, a fingerprint template input method is provided, which may include: acquiring an $i^{th}$ fingerprint image captured by a fingerprint identification sensor, i being a positive integer; obtaining a candidate fingerprint template according to all of the acquired i fingerprint images; detecting whether the candidate fingerprint template meets a preset condition, wherein the preset condition comprises at least one of the following: a coverage area of the candidate fingerprint template is larger than a first threshold value and a number of feature points in the candidate fingerprint template is larger than a second threshold value, and wherein the coverage area is a coverage area for a user's fingerprint; and if the candidate fingerprint template meets the preset condition, inputting the candidate fingerprint template as a fingerprint template of the user's fingerprint.

According to a second aspect of the embodiment of the present disclosure, a fingerprint template input device is provided, which may include: a processor; and a memory configured to store an instruction executable by the processor, wherein the processor may be configured to: acquire an $i^{th}$ fingerprint image captured by a fingerprint identification sensor, i being a positive integer; obtain a candidate fingerprint template according to all of the acquired $i^{th}$ fingerprint image; detect whether the candidate fingerprint template meets a preset condition, the preset condition comprising at least one of the following: a coverage area of the candidate fingerprint template is larger than a first threshold value and a number of feature points in the candidate fingerprint template is larger than a second threshold value, and wherein the coverage area is a coverage area for a user's fingerprint; and if the candidate fingerprint template meets the preset condition, input the candidate fingerprint template as a fingerprint template of the user's fingerprint.

A non-transitory computer-readable storage medium having stored therein instructions that, when executed by a processor of a terminal, causes the terminal to perform a fingerprint template input method, and the method includes: acquiring an ith fingerprint image captured by a fingerprint identification sensor, i being a positive integer; obtaining a candidate fingerprint template according to all of the acquired i fingerprint images; detecting whether the candidate fingerprint template meets a preset condition, wherein the preset condition comprises at least one of the following: a coverage area of the candidate fingerprint template is larger than a first threshold value and a number of feature points in the candidate fingerprint template is larger than a second threshold value, and wherein the coverage area is a coverage area for a user's fingerprint; and inputting the candidate fingerprint template as a fingerprint template of the user's fingerprint if the candidate fingerprint template meets the preset condition.

It is to be understood that the above general descriptions and detailed descriptions below are exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of devices and methods consistent with some aspects related to the embodiments of the present disclosure as recited in the appended claims.

Figure 1:
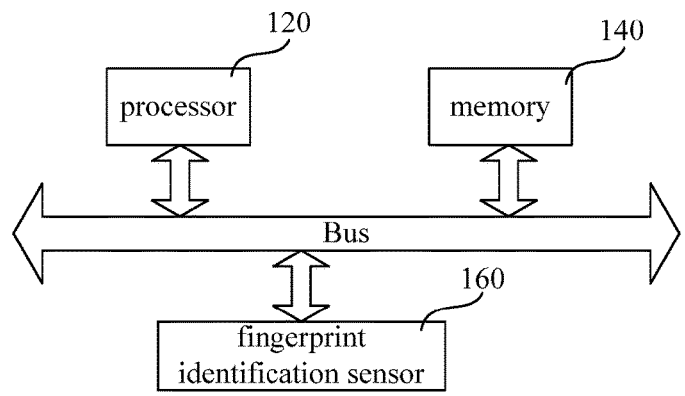
FIG. 1 is a hardware structure schematic view of a mobile terminal according to some exemplary embodiments.

FIG. 1 is a hardware structure diagram of a mobile terminal according to an exemplary embodiment. As shown in FIG. 1, the mobile terminal may be a terminal such as a smart phone, a tablet computer and an electronic book reader. The mobile terminal includes a processor 120, and a memory 140 connected with the processor 120 and fingerprint identification sensor 160 connected with the processor 120, wherein the memory 140 stores instructions executable by the processor 120.

Optionally, the memory 140 stores instructions of a fingerprint algorithm.

The fingerprint identification sensor 160 is also referred to as a fingerprint identification module. The fingerprint identification sensor 160 is configured to acquire a user's fingerprint images. The processor 120 obtains a fingerprint template of the user's fingerprint according to the fingerprint algorithm stored in the memory 140 and the user's fingerprint images acquired by the fingerprint identification sensor 160, and inputs the obtained fingerprint template into the fingerprint identification sensor 160 for identifying the user's fingerprint in a fingerprint identification process by virtue of the fingerprint template, thereby realizing functions of screen unlocking, mobile payment and the like of the mobile terminal.

Figure 2:
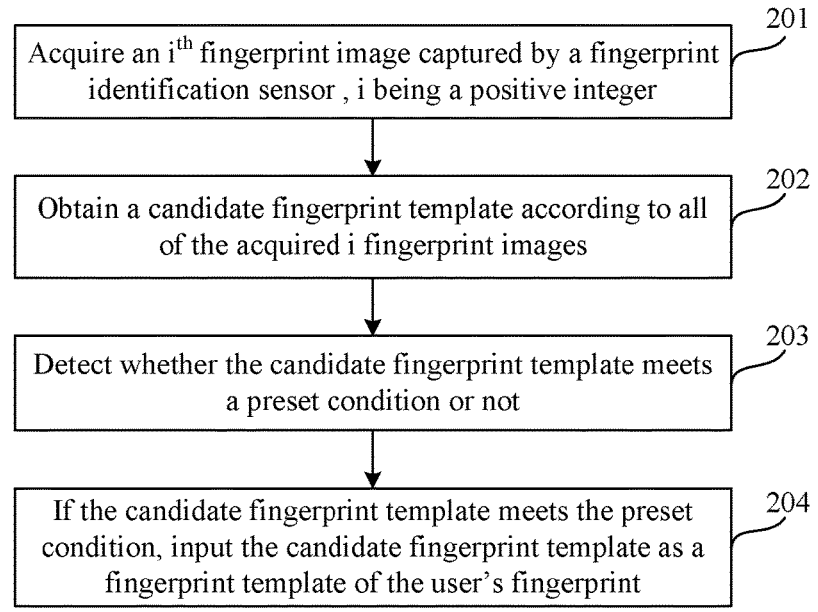
FIG. 2 is a flow chart showing a fingerprint template input method according to an exemplary embodiment.

FIG. 2 is a flow chart showing a fingerprint template input method according to an exemplary embodiment. As shown in FIG. 2, the fingerprint template input method is applied to the mobile terminal shown in FIG. 1, and includes the following steps:

Step 201: an $i^{th}$ fingerprint image captured by a fingerprint identification sensor is acquired, wherein i is a positive integer;

Step 202: a candidate fingerprint template is obtained according to all of the acquired i fingerprint images;

Step 203: it is detected whether the candidate fingerprint template meets a preset condition.

The preset condition includes at least one of the following: a coverage area of the candidate fingerprint template is larger than a first threshold value and the number of feature points in the candidate fingerprint template is larger than a second threshold value, wherein the coverage area is a coverage area for a user's fingerprint; and Step 204: if the candidate fingerprint template meets the preset condition, the candidate fingerprint template is input as a fingerprint template of the user's fingerprint.

From the above, according to the fingerprint template input method provided by the embodiment of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

Figure 3A:
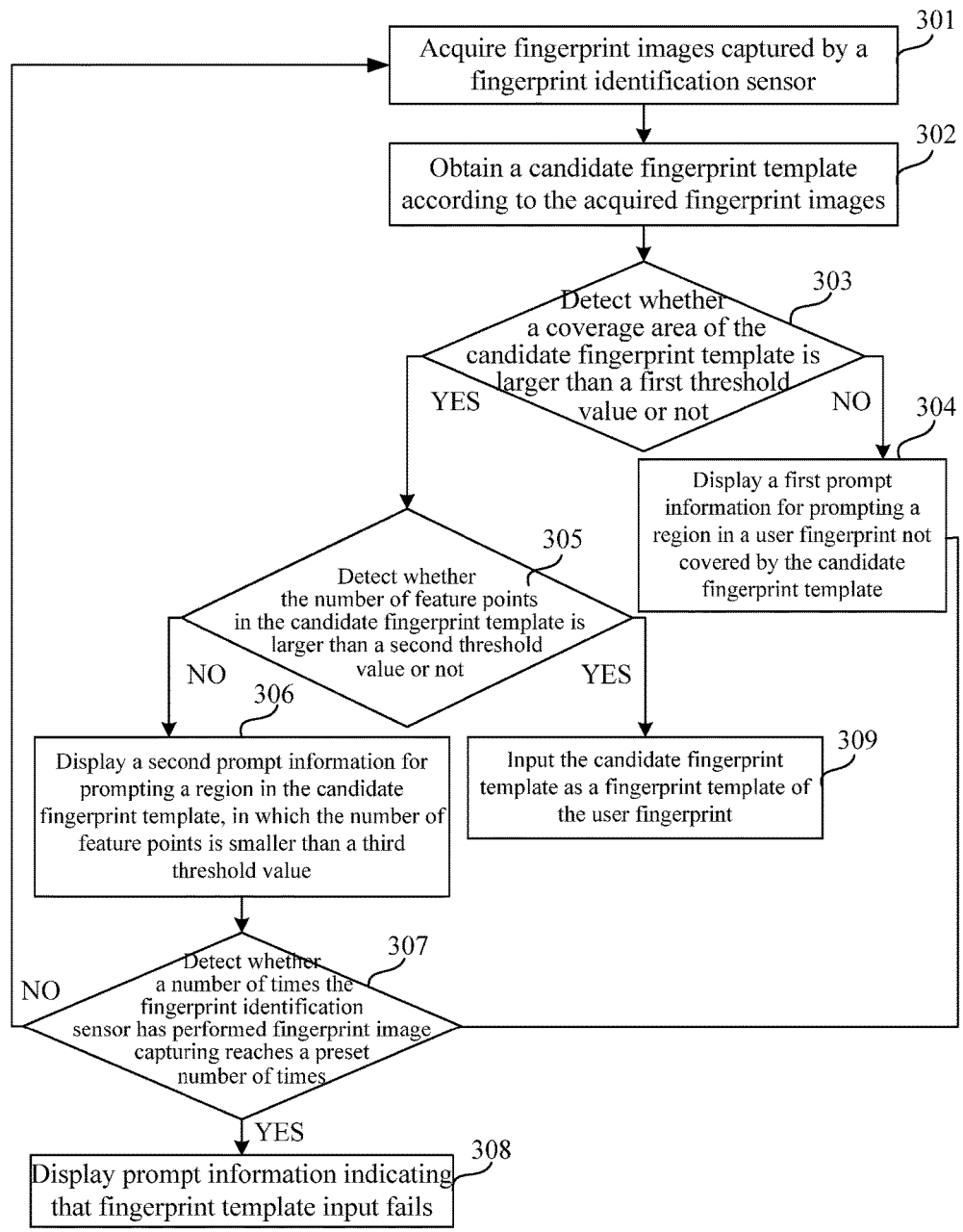
FIG. 3A is a flow chart showing a fingerprint template input method according to another exemplary embodiment.

FIG. 3A is a flow chart showing a fingerprint template input method according to another exemplary embodiment. As shown in FIG. 3A, the fingerprint template input method is applied to the mobile terminal shown in FIG. 1, and includes the following steps.

Step 301: fingerprint images captured by a fingerprint identification sensor are acquired.

In a fingerprint template input process, the fingerprint identification sensor firstly captures the fingerprint images of a user, and then a processor acquires the fingerprint images captured by the fingerprint identification sensor.

Step 302: a candidate fingerprint template is obtained according to the acquired fingerprint images.

The processor obtains the candidate fingerprint template according to the acquired fingerprint images.

Optionally, the candidate fingerprint template includes at least one fingerprint image. When acquiring a fingerprint image captured by the fingerprint identification sensor for the first time, the processor determines the acquired fingerprint image as the candidate fingerprint template; and when acquiring the $i^{th}$ fingerprint image captured by the fingerprint identification sensor, the processor splices all of the acquired i fingerprint images, and determines the spliced fingerprint image as the candidate fingerprint template.

Step 303: it is detected whether a coverage area of the candidate fingerprint template is larger than a first threshold value.

The coverage area of the candidate fingerprint template is a coverage area for the user's fingerprint. That is, an area, covered by a fingerprint in the candidate fingerprint template, of the user's fingerprint is detected.

For example, if an area of the user's fingerprint is 6 square centimeters and the first threshold value is 80% of the area of the user's fingerprint, it is detected whether the area, covered by the candidate fingerprint template, of the user's fingerprint is larger than 4.8 square centimeters.

Step 304: if the coverage area of the candidate fingerprint template is smaller than the first threshold value, first prompt information is displayed.

The first prompt information is used to prompt a region in the user's fingerprint not covered by the candidate fingerprint template.

When the coverage area of the candidate fingerprint template is smaller than the first threshold value, the first prompt information is displayed in the mobile terminal to prompt the region in the user's fingerprint not covered by the candidate fingerprint template to the user, so as for the user to continue providing, according to the first prompt information, the user fingerprint corresponding to the region not covered by the candidate fingerprint template, which is to be captured by the fingerprint identification sensor.

For example, if the area of the user's fingerprint is 6 square centimeters, the first threshold value is 80% of the area of the user's fingerprint and the area of the user's fingerprint covered by the candidate fingerprint template is 4 square centimeters, the coverage area of the candidate fingerprint template is smaller than the first threshold value.

Figure 3B:
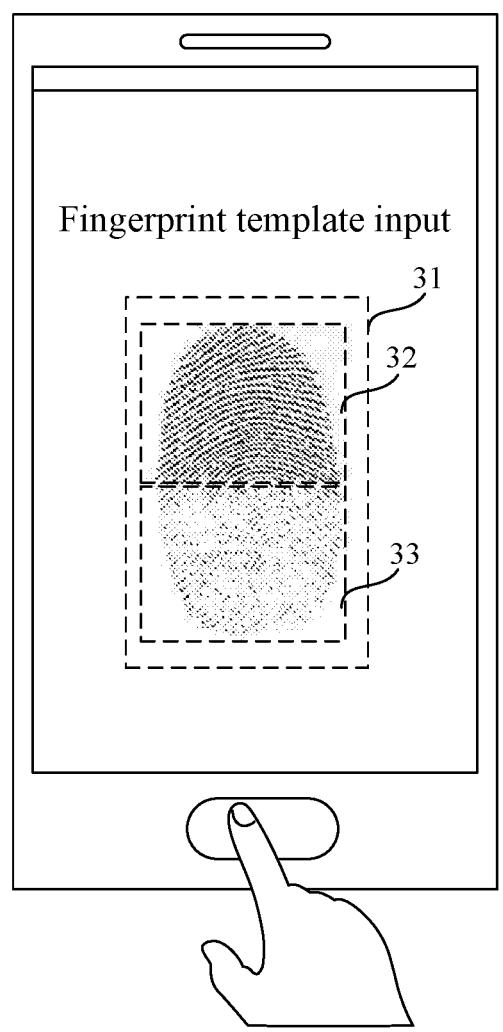
FIG. 3B is a schematic view of displaying first prompt information according to an exemplary embodiment.

For example, as shown in FIG. 3B, when the coverage area of the candidate fingerprint template is smaller than the first threshold value, a fingerprint image 31 is displayed in the mobile terminal, in which a region 32 in a dark color is a fingerprint image in the candidate fingerprint template, and a region 33 in a light color is the region not covered by the candidate fingerprint template. In this way, the user may be prompted to continue providing the user fingerprint corresponding to the region not covered by the candidate fingerprint template, which is to be captured by the fingerprint identification sensor.

When the coverage area of the candidate fingerprint template is smaller than the first threshold value, Step 307 is executed after the first prompt information is displayed.

Step 305: if the coverage area of the candidate fingerprint template is larger than the first threshold value, it is detected whether the number of feature points in the candidate fingerprint template is larger than a second threshold value.

When the coverage area of the candidate fingerprint template is larger than the first threshold value, the number of the feature points in the candidate fingerprint template is extracted by virtue of a fingerprint algorithm stored in a memory, wherein the feature points refer to points extracted by the fingerprint algorithm from features of the fingerprint in the candidate fingerprint template. It is detected whether the number of the feature points in the candidate fingerprint template is larger than the second threshold value.

For example, if the user's fingerprint includes 100 feature points and the second threshold value is 60% of the number of the feature points included in the user's fingerprint, it is detected whether the number of the feature points in the candidate fingerprint template is larger than 60.

Step 306: if the number of the feature points in the candidate fingerprint template is smaller than the second threshold value, second prompt information is displayed.

The second prompt information is used to prompt a region in the candidate fingerprint template in which the number of feature points is smaller than a third threshold value, wherein the second threshold value is larger than the third threshold value.

When the number of the feature points in the candidate fingerprint template is smaller than the second threshold value, the second prompt information is displayed in the mobile terminal to prompt the region in the candidate fingerprint template in which the number of the feature points is smaller than the third threshold value to the user, so as for the user to continue providing, according to the second prompt information, the user fingerprint corresponding to the region in which the number of the feature points is smaller than the third threshold value, which is to be captured by the fingerprint identification sensor. That is, the second prompt information is used to prompt the region in the candidate fingerprint template in which the number of the feature points is small.

Optionally, the third threshold value may be a small numerical value.

For example, if the area of the user's fingerprint is 6 square centimeters, the first threshold value is 80% of the area of the user's fingerprint and the area of the user's fingerprint covered by the candidate fingerprint template is 4 square centimeters, the coverage area of the candidate fingerprint template is smaller than the first threshold value.

Figure 3C:
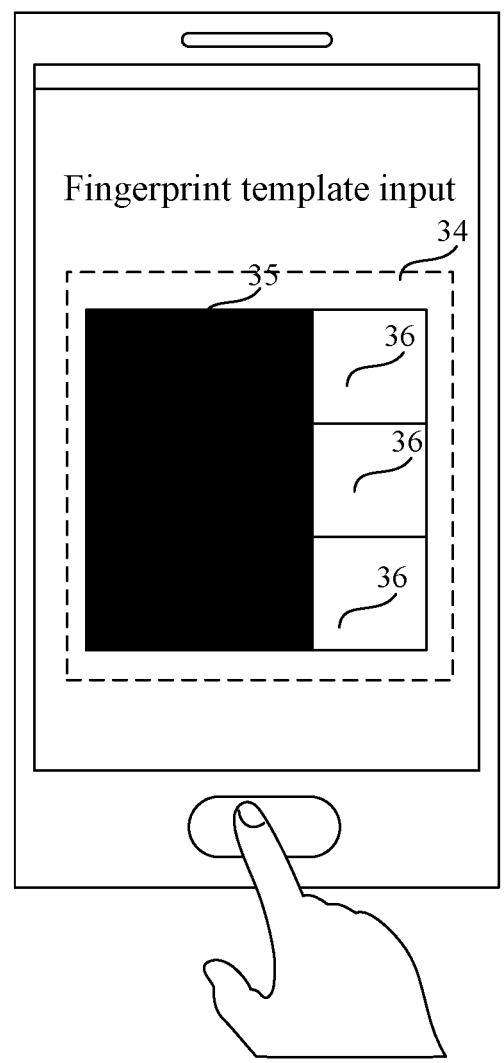
FIG. 3C is a schematic view of displaying second prompt information according to an exemplary embodiment.

For example, as shown in FIG. 3C, when the number of the feature points in the candidate fingerprint template is smaller than the second threshold value, a nine-block box 34 is displayed in the mobile terminal, wherein a black region 35 is a region in which the number of feature points in the candidate fingerprint template is larger than the third threshold value, and white regions 36 are regions in which the number of feature points in the candidate fingerprint template is smaller than the third threshold value. In this way, the user may be prompted to provide, according to the displayed prompt information, fingerprint images of the user's fingerprint corresponding to the white regions 36, which is to be captured by the fingerprint identification sensor.

Step 307: It is detected whether a number of times the fingerprint identification sensor has performed fingerprint image capturing reaches a preset number of times.

When the user provides fingerprint images of the user for the fingerprint identification sensor for multiple times according to the first prompt information or the second prompt information, it is detected whether the number of times the fingerprint identification sensor has performed fingerprint image capturing reaches the preset number of times.

Where the preset number of times refers to a maximum number of times for which the fingerprint identification sensor performs fingerprint image capturing in the fingerprint template input process.

For example, if the maximum number of times for which the fingerprint identification sensor performs fingerprint image capturing in the fingerprint template input process is 25, it is detected whether the number of times the fingerprint identification sensor performs fingerprint image capturing in the fingerprint template input process reaches 25 before each capturing of the fingerprint image by the fingerprint identification sensor.

Step 308: if a number of times the fingerprint identification sensor has performed fingerprint image capturing reaches a preset number of times, prompt information indicating that fingerprint template input fails is displayed.

When the number of times the fingerprint identification sensor has performed fingerprint image capturing reaches the preset number of times in the fingerprint template input process, the prompt information indicating that fingerprint template input fails is displayed in the mobile terminal.

Figure 3D:
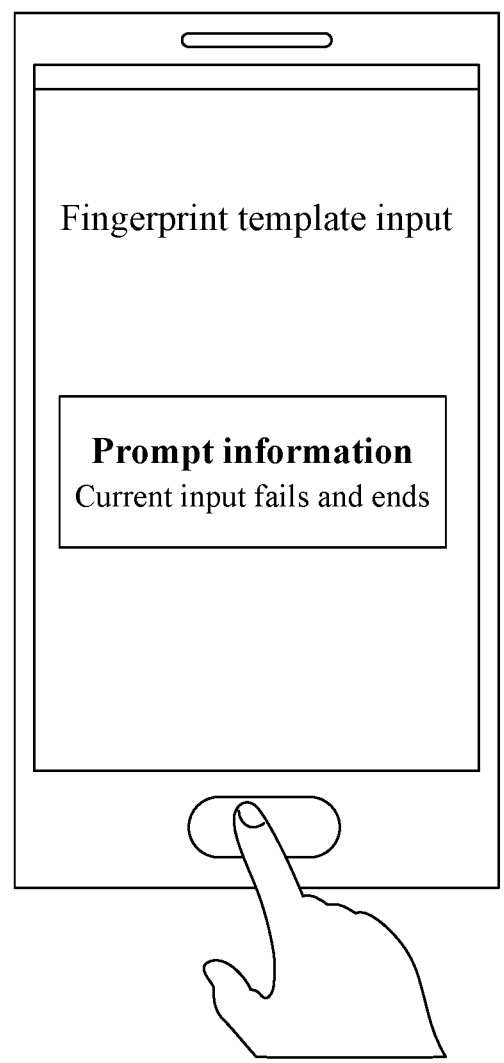
FIG. 3D is a schematic view of displaying input failure information according to an exemplary embodiment.

For example, assuming that the maximum number of times the fingerprint identification sensor performs fingerprint image capturing in the fingerprint template input process is 25, in the fingerprint template input process, when all fingerprint images input by the user do not meet the condition that the coverage area of the candidate fingerprint template is larger than the first threshold value and the number of the feature points in the candidate fingerprint template is larger than the second threshold value, information "input fails and input ends" is displayed in the mobile terminal after the fingerprint identification sensor captures 25 fingerprint images, as shown in FIG. 3D.

Optionally, if the number of times the fingerprint identification sensor performs fingerprint image capturing does not reach the preset number of times, Step 301 is re-executed to acquire a next fingerprint image captured by the fingerprint identification sensor.

Step 309: if the number of the feature points in the candidate fingerprint template is larger than the second threshold value, the candidate fingerprint template is input as a fingerprint template of the user's fingerprint.

When the number of the feature points extracted by the fingerprint algorithm according to the features of the fingerprint in the candidate fingerprint template is larger than the preset second threshold value, the candidate fingerprint template is determined as the fingerprint template of the user's fingerprint, and the candidate fingerprint template is successfully input as the fingerprint template.

From the above, according to the fingerprint template input method provided by the embodiment of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

In addition, when the coverage area of the candidate fingerprint template is smaller than the first threshold value, the first prompt information may be displayed, and the coverage area for each input fingerprint image is fed back to reasonably prompt a region position where a next fingerprint image is to be input, so that the user may accurately input fingerprint information of the fingerprint image.

Moreover, when the number of the feature points in the candidate fingerprint template is smaller than the second threshold value, the second prompt information may be displayed, and the number of feature points of each input fingerprint image is fed back to reasonably prompt a region position where a next fingerprint image is to be input, so that the user may accurately input the fingerprint information of the fingerprint image.

It is to be noted that the sequence for detecting whether the coverage area of the candidate fingerprint template is larger than the first threshold value and detecting whether the number of the feature points in the candidate fingerprint template is larger than the second threshold value is not specifically limited in the embodiment shown in FIG. 3A, and the embodiment shown in FIG. 3A is merely described as an example in which it is detected whether the coverage area of the candidate fingerprint template is larger than the first threshold value, and if yes, it is then detected whether the number of the feature points in the candidate fingerprint template is larger than the second threshold value. As a possible implementation, whether the number of the feature points in the candidate fingerprint template is larger than the second threshold value may be detected at first, and when the number of the feature points in the candidate fingerprint template is larger than the second threshold value, it is detected whether the coverage area of the candidate fingerprint template is larger than the first threshold value.

It is to be noted that the embodiment shown in FIG. 3A is merely described as an example in which the preset condition includes both that the coverage area of the candidate fingerprint template is larger than the first threshold value and the number of the feature points in the candidate fingerprint template is larger than the second threshold value. As a possible implementation, the preset condition may include one of that the coverage area of the candidate fingerprint template is larger than the first threshold value and the number of the feature points in the candidate fingerprint template is larger than the second threshold value, that is, the candidate fingerprint template may be input as the fingerprint template of the user's fingerprint when one of the conditions is met.

In a specific example, it is supposed that the number of finite feature points included in a typical fingerprint of the user is 100, an area of the user's fingerprint is 8 square centimeters, the first threshold value is 80% of the area of the user's fingerprint and the second threshold value is 60% of the number of the feature points of the user's fingerprint. If the user repeatedly input the same area into the fingerprint identification sensor, the number of effective feature points included in the area is just 30 and the area is just 3 square centimeters, the coverage area of the candidate fingerprint template is always smaller than the first threshold value, the number of the feature points in the candidate fingerprint template is also always smaller than the second threshold value, and the prompt information indicating that fingerprint template input fails is displayed after a number of times the fingerprint identification sensor has performed fingerprint image capturing reaches a preset number of times. In another possible case, the user provides fingerprint images of different regions for the fingerprint identification sensor to make the coverage area of the candidate fingerprint template larger than the first threshold value, but quality of each fingerprint image captured by the fingerprint identification sensor is poor, which makes the number of the feature points in the candidate fingerprint template smaller than the second threshold value, and if the number of the feature points in the candidate fingerprint template is still smaller than the second threshold value when a number of times the fingerprint identification sensor has performed fingerprint image capturing reaches a preset number of times, the prompt information indicating that fingerprint template input fails is displayed.

Figure 4A:
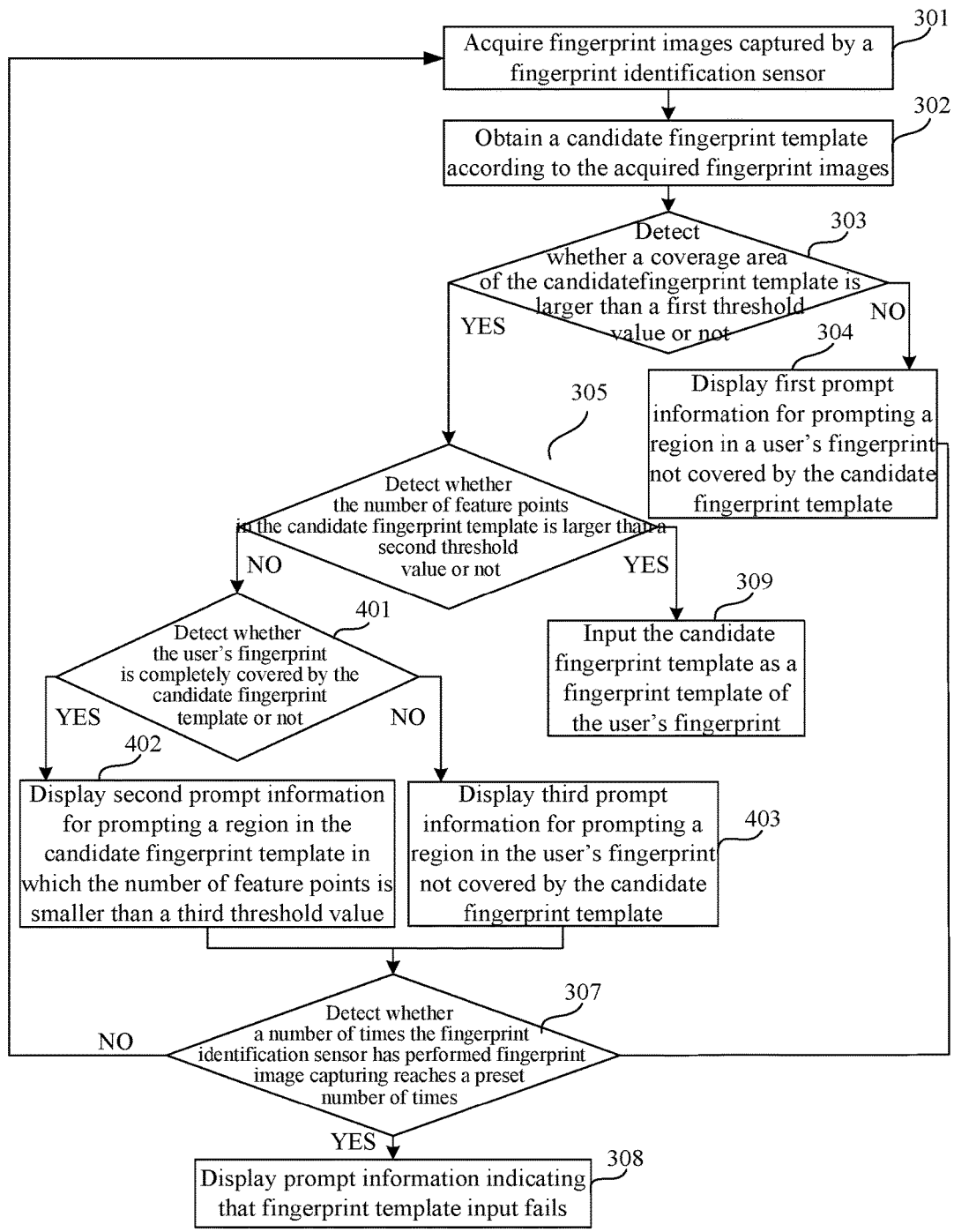
FIG. 4A is a flow chart showing a fingerprint template input method according to another exemplary embodiment.

Based on the fingerprint template input method shown in FIG. 3A, as a possible implementation, the display of the second prompt information in Step 306 may be replaced with the following steps, as shown in FIG. 4A.

Step 401: it is detected whether the user's fingerprint is completely covered by the candidate fingerprint template.

When the number of the feature points in the candidate fingerprint template is smaller than the second threshold value, it is further detected whether the user's fingerprint is completely covered by the candidate fingerprint template.

Step 402: if the user's fingerprint is completely covered by the candidate fingerprint template, second prompt information is displayed.

The second prompt information is used to prompt a region in which the number of the feature points in the candidate fingerprint template is smaller than a third threshold value, wherein the second threshold value is larger than the third threshold value.

When the number of the feature points in the candidate fingerprint template is smaller than the second threshold value, the second prompt information is displayed in the mobile terminal to prompt the region in which the number of the feature points in the candidate fingerprint template is smaller than the third threshold value, so as for the user to continue providing, according to the second prompt information, the user fingerprint corresponding to the region in which the number of the feature points in the fingerprint identification sensor is smaller than the third threshold value. That is, the second prompt information is used to prompt the region with few feature points in the candidate fingerprint template.

Optionally, the third threshold value may be a smaller numerical value.

Step 403: if the user's fingerprint is not completely covered by the candidate fingerprint template, third prompt information is displayed.

The third prompt information is used to prompt a region in the user's fingerprint not covered by the candidate fingerprint template.

If the user's fingerprint is not completely covered by the candidate fingerprint template, the third prompt information is displayed.

When the user's fingerprint is not completely covered by the candidate fingerprint template, the third prompt information is displayed in the mobile terminal to prompt the region in the user's fingerprint not covered by the candidate fingerprint template, so as for the user to continue providing, according to the third prompt information, the user fingerprint corresponding to the region not covered by the candidate fingerprint template, which is to be captured by the fingerprint identification sensor.

Figure 4B:
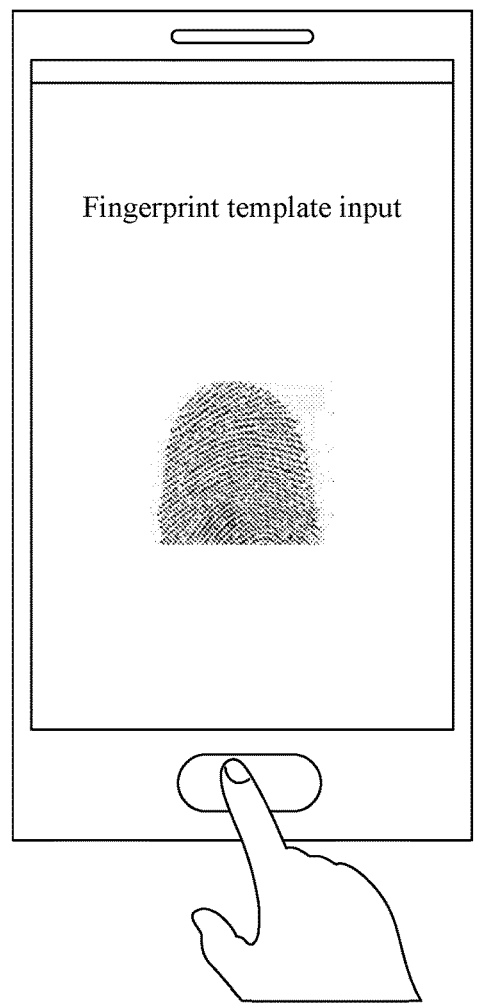
FIG. 4B is a schematic view of displaying third prompt information, according to an exemplary embodiment.

For example, as shown in FIG. 4B, when the user's fingerprint is not completely covered by the candidate fingerprint template, just a region of the user's fingerprint covered by the candidate fingerprint template is displayed in the mobile terminal; and the user continues providing, according to the displayed candidate fingerprint template, the user fingerprint corresponding to the region not covered by the candidate fingerprint template, which is to be captured by the fingerprint identification sensor.

From the above, according to the fingerprint template input method provided by the embodiment of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

In addition, when the number of the feature points in the candidate fingerprint template is smaller than the second threshold value, it is detected whether the user's fingerprint is completely covered by the candidate fingerprint template, the second prompt information or the third prompt information may be displayed, and the number of feature points of or coverage area for each input fingerprint image is fed back to reasonably prompt a region position where a next fingerprint image is to be input, so that the user may accurately input the fingerprint information of the fingerprint image.

It is to be noted that in the embodiment shown in FIG. 3A and the embodiment shown in FIG. 4A, the prompt information may be displayed in a text display form, a picture display form, a table display form, a voice display form, an animation display form or the like, as long as the fingerprint in the candidate fingerprint template, the region not covered by the candidate fingerprint template and the region in which the number of the feature points in the candidate fingerprint template is smaller than the third threshold value may be distinguished. The manner for displaying the prompt information is not specifically limited in the embodiment, and the embodiment shown in FIG. 3A and the embodiment shown in FIG. 4A are described in a picture form and a nine-block box form merely as examples.

A device embodiment of the present disclosure will be described below, and may be configured to implement the method embodiment of the present disclosure. For details undisclosed in the device embodiment of the present disclosure, the method embodiment of the present disclosure may be referred to.

Figure 5:
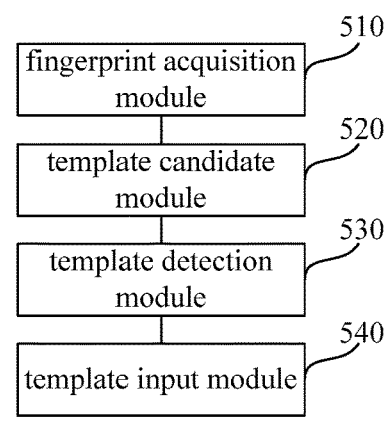
FIG. 5 is a block diagram of a fingerprint template input device according to an exemplary embodiment.

FIG. 5 is a block schematic view of a fingerprint template input device according to an exemplary embodiment. As shown in FIG. 5, the fingerprint template input device is applied to a mobile terminal shown in FIG. 1, and the fingerprint template input device includes, but not limited to:

a fingerprint acquisition module 510, configured to acquire an $i^{th}$ fingerprint image captured by a fingerprint identification sensor, i being a positive integer;

a template candidate module 520, configured to obtain a candidate fingerprint template according to all of the acquired i fingerprint images;

a template detection module 530, configured to detect whether the candidate fingerprint template meets a preset condition, the preset condition including at least one of the following: a coverage area of the candidate fingerprint template is larger than a first threshold value and the number of feature points in the candidate fingerprint template is larger than a second threshold value, and the coverage area being a coverage area for a user's fingerprint; and a template input module 540 configured to, if the candidate fingerprint template meets the preset condition, input the candidate fingerprint template as a fingerprint template of the user's fingerprint.

From the above, according to the fingerprint template input device provided by the embodiment of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

Figure 6:
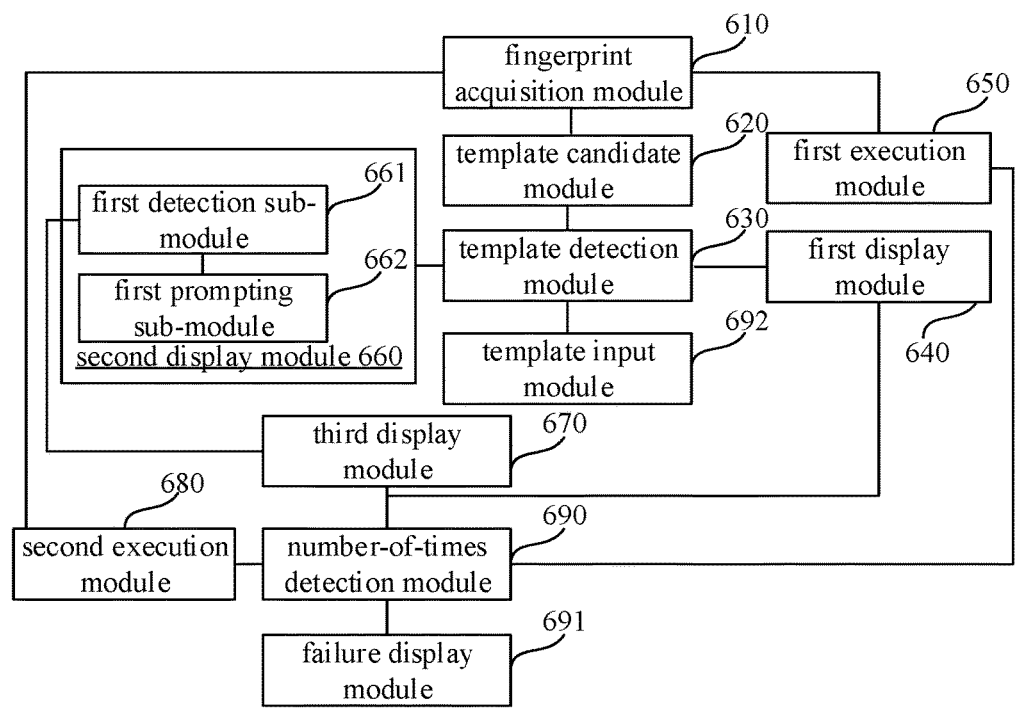
FIG. 6 is a block diagram of a fingerprint template input device according to another exemplary embodiment.

FIG. 6 is a block schematic view of a fingerprint template input device, according to an exemplary embodiment. As shown in FIG. 6, the fingerprint template input device is applied to a mobile terminal shown in FIG. 1, and the fingerprint template input device includes, but not limited to:

a fingerprint acquisition module 610, configured to acquire an $i^{th}$ fingerprint image captured by a fingerprint identification sensor, i being a positive integer;

a template candidate module 620, configured to obtain a candidate fingerprint template according to all of the acquired i fingerprint images;

a template detection module 630, configured to detect whether the candidate fingerprint template meets a preset condition, the preset condition including at least one of the following: a coverage area of the candidate fingerprint template is larger than a first threshold value and the number of feature points in the candidate fingerprint template is larger than a second threshold value, where the coverage area is a coverage area for a user's fingerprint;

the preset condition includes that the coverage area of the candidate fingerprint template is larger than the first threshold value;

a first display module 640, configured to, if the coverage area of the candidate fingerprint template is smaller than the first threshold value, display first prompt information, the first prompt information being configured to prompt a region in the user's fingerprint not covered by the candidate fingerprint template;

a first execution module 650, configured to set i=i+1 and re-execute the step of acquiring the ith fingerprint image captured by the fingerprint identification sensor;

the preset condition includes that the number of the feature points in the candidate fingerprint template is larger than the second threshold value, a second display module 660, configured to, if the number of the feature points in the candidate fingerprint template is smaller than the second threshold value, display second prompt information, the second prompt information being used to prompt a region in the candidate fingerprint template in which the number of feature points is smaller than a third threshold value, wherein the second threshold value is larger than the third threshold value.

In this embodiment, optionally, the second display module 660 may include the following sub-modules:

a first detection sub-module 661, configured to detect whether the user's fingerprint is completely covered by the candidate fingerprint template, and a first prompting sub-module 662, configured to, if the user's fingerprint is completely covered by the candidate fingerprint template, display the second prompt information;

a third display module 670, configured to, if the user's fingerprint is not completely covered by the candidate fingerprint template, display third prompt information, wherein the third prompt information is used to prompt a region in the user's fingerprint not covered by the candidate fingerprint template;

a second execution module 680, configured to set i=i+1, and re-execute the step of acquiring the ith fingerprint image acquired by the fingerprint identification sensor;

a number-of-times detection module 690, configured to detect whether a number of times the fingerprint identification sensor has performed fingerprint image capturing reaches a preset number of times; and a failure display module 691, configured to, if the number of times the fingerprint identification sensor has performed fingerprint image capturing reaches the preset number of times, display prompt information indicating that fingerprint template input fails; and a template input module 692, configured to, when the candidate fingerprint template meets the preset condition, input the candidate fingerprint template as a fingerprint template of the user's fingerprint.

From the above, according to the fingerprint template input device provided by the embodiment of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

In addition, when the coverage area of the candidate fingerprint template is smaller than the first threshold value, the first prompt information may be displayed, and the coverage area for each input fingerprint image is fed back to reasonably prompt a region position where a next fingerprint image is to be input, so that the user may accurately input fingerprint information of the fingerprint image.

Moreover, when the number of the feature points in the candidate fingerprint template is smaller than the second threshold value, the second prompt information may be displayed, and the number of feature points of each input fingerprint image is fed back to reasonably prompt a region position where a next fingerprint image is to be input, so that the user may accurately input the fingerprint information of the fingerprint image.

With respect to the devices in the above embodiments, the specific manners for performing operations for individual modules therein have been described in detail in the embodiments regarding the methods, which will not be elaborated herein.

An exemplary embodiment of the present disclosure provides a fingerprint template input device, which may implement a fingerprint template input method provided by the embodiment of the present disclosure. The fingerprint template input device includes: a processor; and a memory configured to store an instruction executable by the processor, wherein the processor is configured to:

acquire an $i^{th}$ fingerprint image captured by a fingerprint identification sensor, i being a positive integer;

obtain a candidate fingerprint template according to all of the acquired i fingerprint images;

detect whether the candidate fingerprint template meets a preset condition, the preset condition including at least one of the following: a coverage area of the candidate fingerprint template is larger than a first threshold value and the number of feature points in the candidate fingerprint template is larger than a second threshold value, and the coverage area being a coverage area for a user's fingerprint; and if the candidate fingerprint template meets the preset condition, input the candidate fingerprint template as a fingerprint template of the user's fingerprint.

Figure 7:
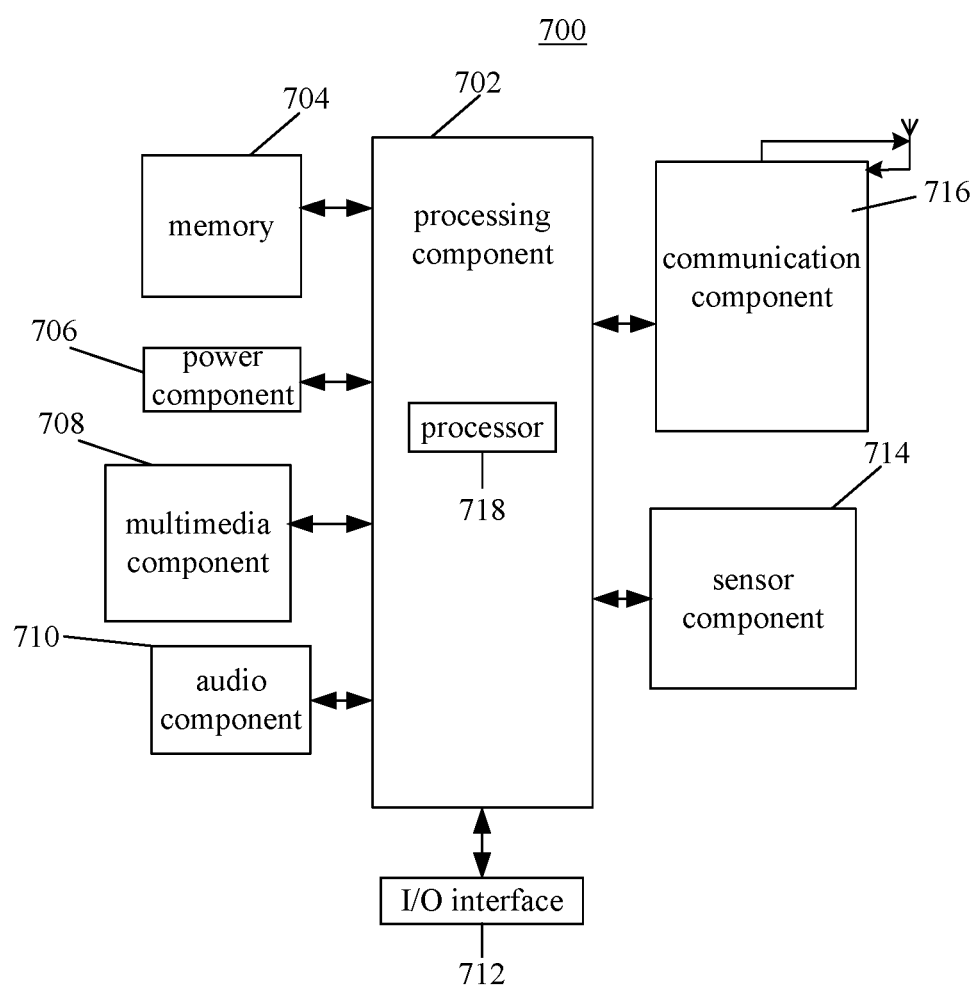
FIG. 7 is a block diagram of another fingerprint template input device according to an exemplary embodiment.

FIG. 7 is a block schematic view of another fingerprint template input device according to an exemplary embodiment. For example, the device 700 may be a mobile phone, a computer, a digital broadcast terminal, a messaging device, a gaming console, a tablet, a medical device, exercise equipment, a personal digital assistant and the like.

Referring to FIG. 7, the device 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the device 700. Examples of such data include instructions for any application programs or methods operated on the device 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 700. The power component 706 may include a power management system, one or more power supplies, and other components associated with the generation, management and distribution of power for the device 700.

The multimedia component 708 includes a screen providing an output interface between the device 700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the device 700 is in the operation mode, such as a call mode, a recording mode and a voice recognition mode. The received audio signal may be further stored in the memory 704 or sent through the communication component 716. In some embodiments, the audio component 710 further includes a speaker configured to output the audio signal.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The sensor component 714 includes one or more sensors configured to provide status evaluation in various aspects for the device 700. For instance, the sensor component 714 may detect an on/off status of the device 700 and relative positioning of components, such as a display and small keyboard of the device 700, and the sensor component 714 may further detect a change in position of the device 700 or a component of the device 700, presence or absence of contact between the user and the device 700, orientation or acceleration/deceleration of the device 700 and a change in temperature of the device 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 700 and another device. The device 700 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 716 receives a broadcast signal or broadcast associated information from an external broadcast management system through a broadcast channel. In an exemplary embodiment, the communication component 716 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and other technologies.

In an exemplary embodiment, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 704 including an instruction, and the instruction may be executed by the processor 718 of the device 700 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the embodiments of the present disclosure. This application is intended to cover any variations, uses, or adaptations of the embodiments of the present disclosure following the general principles thereof and including such departures from the embodiments of the present disclosure as come within known or customary practice in the art. It is intended that the specification and examples be considered as exemplary, with a true scope and spirit of the embodiments of the present disclosure being indicated by the following claims.

It will be appreciated that the embodiments of the present disclosure is not limited to the exact construction that has been described above and illustrated in the accompanying drawings, and that various modifications and changes may be made without departing from the scope thereof. It is intended that the scope of the embodiments of the present disclosure be limited by the appended claims.

In the embodiments of the present disclosure, the $i^{th}$ fingerprint image captured by the fingerprint identification sensor is acquired, i being a positive integer; the candidate fingerprint template is obtained according to all of the acquired i fingerprint images; it is detected whether the candidate fingerprint template meets the preset condition; if the candidate fingerprint template meets the preset condition, the candidate fingerprint template is input as the fingerprint template of the user's fingerprint. Therefore, it avoids that a specified fixed number of inputs is much greater than a practically required number of inputs due to the fact that a fixed-number-of-inputs method improves quality of a fingerprint template by repeatedly inputting fingerprint images of the same region. Since the candidate fingerprint template is input as the fingerprint template of the user's fingerprint when the candidate fingerprint template meets the preset condition, the number of fingerprint image inputs is reduced and the fingerprint template input efficiency is improved.

What is claimed is:

1. A fingerprint template input method, comprising:
   acquiring an $i^{th}$ fingerprint image captured by a fingerprint identification sensor, i being a positive integer;
   obtaining a candidate fingerprint template according to all of the acquired i fingerprint images;
   detecting whether the candidate fingerprint template meets a preset condition or not, wherein the preset condition comprises: a coverage area of the candidate fingerprint template is larger than a first threshold value, wherein the coverage area is a coverage area for a user's fingerprint; and
   when the coverage area of the candidate fingerprint template is smaller than the first threshold value, displaying first prompt information for prompting a region in the user's fingerprint, which is uncovered by the candidate fingerprint template; and
   setting i=i+1, and re-executing the step of acquiring the $i^{th}$ fingerprint image captured by the fingerprint identification sensor.

2. The method according to claim 1, wherein the preset condition further comprises that the number of the feature points in the candidate fingerprint template is larger than the second threshold value, and
   wherein the method further comprises:
   if the number of the feature points in the candidate fingerprint template is smaller than the second threshold value, displaying second prompt information for prompting a region in which the number of the feature points in the candidate fingerprint template is smaller than a third threshold value, wherein the second threshold value is larger than the third threshold value; and
   setting i=i+1, and re-executing the step of acquiring the $i^{th}$ fingerprint image captured by the fingerprint identification sensor.

3. The method according to claim 2, wherein displaying the second prompt information comprises:
   detecting whether the user's fingerprint is completely covered by the candidate fingerprint template or not; and
   if the user's fingerprint is completely covered by the candidate fingerprint template, displaying the second prompt information.

4. The method according to claim 3, further comprising:
   if the user's fingerprint is not completely covered by the candidate fingerprint template, displaying third prompt information for prompting a region in the user's fingerprint, which is uncovered by the candidate fingerprint template.

5. The method according to claim 1, further comprising:
   detecting whether the fingerprint identification sensor has performed fingerprint image capturing for at least a preset number of times or not; and
   if the fingerprint identification sensor has performed fingerprint image capturing for at least the preset number of times, displaying prompt information indicating that fingerprint template input fails.

6. A fingerprint template input device, comprising:
   a processor; and
   a memory configured to store an instruction executable by the processor,
   wherein the processor is configured to:
   acquire an $i^{th}$ fingerprint image captured by a fingerprint identification sensor, i being a positive integer;
   obtain a candidate fingerprint template according to all of the acquired i fingerprint images;
   detect whether the candidate fingerprint template meets a preset condition or not, wherein the preset condition comprises: a coverage area of the candidate fingerprint template is larger than a first threshold value, wherein the coverage area is a coverage area for a user's fingerprint; and
   when the coverage area of the candidate fingerprint template is smaller than the first threshold value, display first prompt information, for prompting a region in the user's fingerprint, which is uncovered by the candidate fingerprint template; and
   set i=i+1 and re-execute the step of acquiring the $i^{th}$ fingerprint image captured by the fingerprint identification sensor.

7. The device according to claim 6, wherein the preset condition further comprises that the number of the feature points in the candidate fingerprint template is larger than the second threshold value, and
   wherein the processor is further configured to:
   if the number of the feature points in the candidate fingerprint template is smaller than the second threshold value, display second prompt information for prompting a region in which the number of feature points in the candidate fingerprint template is smaller than a third threshold value and the second threshold value being larger than the third threshold value; and
   set i=i+1, and re-execute the step of acquiring the $i^{th}$ fingerprint image captured by the fingerprint identification sensor.

8. The device according to claim 7, wherein the display of the second prompt information comprises:
   detecting whether the user's fingerprint is completely covered by the candidate fingerprint template or not; and
   if the user's fingerprint is completely covered by the candidate fingerprint template, displaying the second prompt information.

9. The device according to claim 7, wherein the processor is further configured to:
   if the user's fingerprint is not completely covered by the candidate fingerprint template, display third prompt information for prompting a region in the user's fingerprint, which is uncovered by the candidate fingerprint template.

10. The device according to claim 6, wherein the processor is further configured to:

detect whether the fingerprint identification sensor has performed fingerprint image capturing for at least a preset number of times or not; and if the fingerprint identification sensor has performed fingerprint image capturing for at least the preset number of times, display prompt information indicating that fingerprint template input fails.

11. A non-transitory computer-readable storage medium having stored therein instructions that, when executed by a processor of a terminal, causes the terminal to perform a fingerprint template input method, the method comprising:

acquiring an $i^{th}$ fingerprint image captured by a fingerprint identification sensor, i being a positive integer;

obtaining a candidate fingerprint template according to all of the acquired i fingerprint images;

detecting whether the candidate fingerprint template meets a preset condition or not, wherein the preset condition comprises: a coverage area of the candidate fingerprint template is larger than a first threshold value, wherein the coverage area is a coverage area for a user's fingerprint; and when the coverage area of the candidate fingerprint template is smaller than the first threshold value, displaying first prompt information for prompting a region in the user's fingerprint, which is uncovered by the candidate fingerprint template; and setting i=i+1, and re-executing the step of acquiring the $i^{th}$ fingerprint image captured by the fingerprint identification sensor.

12. The non-transitory computer-readable storage medium according to claim 11, wherein the preset condition further comprises that the number of the feature points in the candidate fingerprint template is larger than the second threshold value, and wherein the method further comprises:

if the number of the feature points in the candidate fingerprint template is smaller than the second threshold value, displaying second prompt information for prompting a region in which the number of the feature points in the candidate fingerprint template is smaller than a third threshold value, wherein the second threshold value is larger than the third threshold value; and setting i=i+1, and re-executing the step of acquiring the $i^{th}$ fingerprint image captured by the fingerprint identification sensor.

13. The non-transitory computer-readable storage medium according to claim 12, wherein displaying the second prompt information comprises:

detecting whether the user's fingerprint is completely covered by the candidate fingerprint template or not; and if the user's fingerprint is completely covered by the candidate fingerprint template, displaying the second prompt information.

14. The non-transitory computer-readable storage medium according to claim 13, wherein the method further comprises: if the user's fingerprint is not completely covered by the candidate fingerprint template, displaying third prompt information for prompting a region in the user's fingerprint, which is uncovered by the candidate fingerprint template.

15. The non-transitory computer-readable storage medium according to claim 11, wherein the method further comprises:

detecting whether the fingerprint identification sensor has performed fingerprint image capturing for at least a preset number of times or not; and if the fingerprint identification sensor has performed fingerprint image capturing for at least the preset number of times, displaying prompt information indicating that fingerprint template input fails.

16. The method according to claim 2, further comprising:

if the candidate fingerprint template meets the preset condition, inputting the candidate fingerprint template as a fingerprint template of the user's fingerprint.

17. The device according to claim 7, wherein the processor is further configured to:

if the candidate fingerprint template meets the preset condition, input the candidate fingerprint template as a fingerprint template of the user's fingerprint.

18. The non-transitory computer-readable storage medium according to claim 12, wherein the method further comprises:

if the candidate fingerprint template meets the preset condition, inputting the candidate fingerprint template as a fingerprint template of the user's fingerprint.

* * * * *